United States Patent Office.

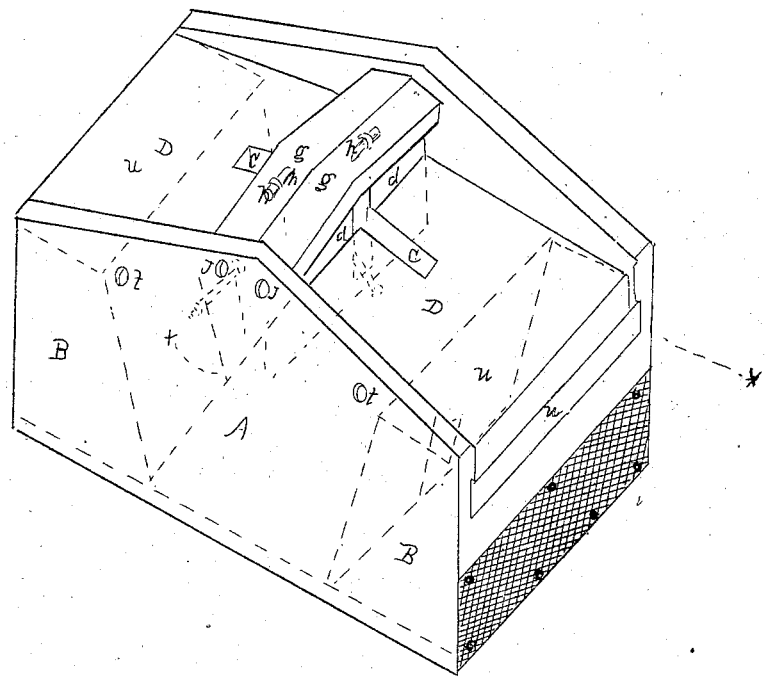

WILLIAM J. BIDDLE AND HENRY L. BIDDLE, OF NEW MADISON, OHIO.

Letters Patent No. 74,658, dated February 18, 1868.

IMPROVED ANIMAL-TRAP.

The Schedule referred to in these Letters Patent and making part of the same.

TO ALL WHOM IT MAY CONCERN:

Be it known that we, WILLIAM J. BIDDLE and HENRY L. BIDDLE, of New Madison, in the county of Darke, and State of Ohio, have invented a new and useful Improvement in Animal-Traps; and we do hereby declare that the following is a full, clear, and exact description of the same, reference being had to the accompanying drawings making a part of this specification, in which—

Figure 1 is a perspective view, and

Figure 2 a longitudinal section.

The same letters in the different figures refer to corresponding parts of the invention.

Our invention relates to a self-setting or readjusting animal-trap, embracing a combination and arrangement of devices calculated to easily entrap the animal, and to successfully prevent its escape after being caught.

To enable others skilled in the art to make and use our invention, we will proceed to describe it with reference to the drawings.

Each half of the box, fig. 1, contains duplicate devices, forming a trap, the two being joined to complete the arrangement. Said box is divided into three compartments, as shown in fig. 2, and by dotted lines, fig. 1.

A is a central compartment, common to both traps, and B and B are end-compartments. D and D represent tilting-platforms, pivoted at $t$. $g$ and $g$ are wooden bars, supported on pivots $j$. $e$ and $e$ are latches or triggers, attached to bars $g$ and $g$, on opposite sides of their centre, as seen at $h$ and $h$. Said triggers or latches form angles, suitable to support the inner ends of platforms D, as shown in fig. 2. $d$ represents a partition, extending a short distance below a level with platforms D. Said partition is slotted centrally for the accommodation of latches $e$ and $e$. The inner ends of the platforms D and D are provided with slots, $c$ and $c$, for the purpose of allowing sufficient action of said latches $c$ and $e$. Partitions $a$ and $a$ are provided with apertures, which latter are protected with gates $b$ and $b$. Said gates, being pivoted at I, can be raised by the animal, as shown by dotted lines $s$ and $s$, but is prevented from being raised in the opposite direction by its top striking the partition above the aperture. R represents wire cloth at the ends of the box, for the purpose of admitting light to compartments B.

The bait is secured on the top of bars $g$, to procure which the animal approaches on platform D, and by pulling at the bait turns bar $g$, thus throwing out the latch $e$, and, permitting the end of platform D to drop, precipitates the animal into compartment A. The weight of the outer end of platform D is sufficient to restore said platform to its former position, where it is again supported by latch $e$. The animal, being attracted by the light, passes under gate B, and from which it is prevented from returning by said gate. The animals may be removed from the trap by turning the latter bottom up, and drawing the slides $w$, which cover compartments B.

Having thus fully described our said invention, what we claim, and desire to secure by Letters Patent, is—

The combination of the tilting-platform D with the pivoted bar $g$, arranged for holding the bait, and latch $e$, fastened to the same, substantially as described and for the purpose set forth.

W. J. BIDDLE,
H. L. BIDDLE.

Witnesses:
C. D. BENINGTON,
M. T. McWHINNEY.